United States Patent [19]
Suda et al.

[11] Patent Number: 5,663,821
[45] Date of Patent: Sep. 2, 1997

[54] OPTICAL SEMICONDUCTOR DEVICE MODULE

[75] Inventors: Hiroshi Suda; Takeshi Nakamura; Hirofumi Nemoto; Akinobu Suzuki, all of Tokyo, Japan

[73] Assignee: Mitsubishi Denki Kabushiki Kaisha, Tokyo, Japan

[21] Appl. No.: 561,783

[22] Filed: Nov. 22, 1995

[30] Foreign Application Priority Data

Dec. 2, 1994 [JP] Japan ............. 6-299702

[51] Int. Cl.⁶ ............................................. H04B 10/00
[52] U.S. Cl. .................. 359/152; 359/131; 359/159; 359/168; 257/81
[58] Field of Search ............................. 359/111, 114, 359/127, 129, 131, 152, 159, 163, 168, 589–590; 455/90; 257/81

[56] References Cited

U.S. PATENT DOCUMENTS 4,767,171  8/1988  Keil et al. ............................. 359/127
5,416,624  5/1995  Karstensen ........................... 359/163
5,521,759  5/1996  Dobrowolski et al. ............... 359/590

FOREIGN PATENT DOCUMENTS 0 197 841  10/1986  European Pat. Off. .......... G02B 6/42
0 250 331  12/1987  European Pat. Off. .......... G02B 6/42
0 559 551   9/1993  European Pat. Off. .......... G02B 6/42

OTHER PUBLICATIONS

The European Search Report related to EP Apl No. 95118962.0.

*Primary Examiner*—Kinfe-Michael Negash
*Attorney, Agent, or Firm*—Wolf, Greenfield & Sacks, P.C.

[57] ABSTRACT

An optical semiconductor device module comprising a light emitting element, an optical fiber, a light receiving element and an optical filter. The optical semiconductor module further includes a light absorbing-reflecting section for absorbing some of the stray beams which cannot pass through the optical filter, and reflecting some of such stray beams in a direction opposite to an optical axis of the beams. The light absorbing-reflecting section is present in a module casing such that it faces, on the optical axis, the light receiving element via the optical filter.

21 Claims, 5 Drawing Sheets

OPTICAL SEMICONDUCTOR DEVICE MODULE

BACKGROUND OF THE INVENTION

1. Field of the Invention

This invention relates to an optical semiconductor device module, and more particularly to an optical semiconductor device module applicable to two-way optical communication through wavelength division multiplexing.

2. Description of the Prior Art

FIG. 6 of the accompanying drawings is a schematic view showing a conventional optical semiconductor device module published in Research Report OQE91-108 of The Institute of Electronics, Information and Communication Engineers.

Referring to FIG. 6, this optical semiconductor optical device module comprises a module casing 1 (called "casing 1"), a light emitting element 2, sub-mounts 3, 5, 7, a monitoring photodiode 4, a light receiving element 6, a first lens 8, a lens holder 9, an optical fiber 10, an optical filter 11, a second lens 12, a band-pass filter 13, a sealing glass window 14, and a fiber holder 15. A plurality of terminals 16 are arranged outside the casing 1.

The light emitting element 2 is made of a semiconductor laser chip, and is soldered onto the sub-mount 3. The monitoring photodiode 4 is made of a semiconductor photodiode chip, and is secured on the sub-mount 5. The monitoring photodiode 4 can detect an optical output from the light emitting element 2. The light receiving element 6 is made of a semiconductor photodiode chip, and is soldered onto the sub-mount 7. The sub-mount 7 is soldered to a part of the casing 1 at a position such that the light receiving element 6 can converge beams which arrive via the optical fiber 10 and are reflected by the optical filter 11.

The first lens 8 is attached to the lens holder 9, and converges beams emitted by the light emitting element 2. The converged beams pass through the optical filter 11, and are converged into the optical fiber 10. The lens holder 9 is soldered to the casing 1 at a position such that the beams from the light emitting element 2 are converged into the optical fiber 10. The second lens 12 is soldered to the casing 1 at a position where the beams reflected by the optical filter 11 are converged in the light receiving element 6.

The optical filter 11 includes a glass plate, a multi-layer dielectric film filter, and an anti-reflection film for preventing reflection of the beams from the light emitting element 2. Both the multi-layer dielectric film filter and the anti-reflection film are respectively formed on opposite sides of the glass plate. The optical filter 11 is fixed to the casing 1 by soldering. Beams having particular wavelengths can pass through the bandpass filter 13, which is secured to the second lens 12 using an adhesive.

The sealing glass window 14 is secured to the casing 1 at a position between the optical filter 11 and the optical fiber 10. Fusible glass is used to secure the sealing glass window 14 so as to accomplish air tightness.

The terminals 16 are arranged outside the casing 1 also using the fusible glass so as to accomplish air tightness. In the optical semiconductor device module of FIG. 6, the light emitting element 2, monitoring photodiode 4 and light receiving element 6 are electrically connected to the terminals 16 via a connecting mechanism, not shown.

In FIG. 6, a cover for the casing 1 is omitted. The cover is secured to the casing 1 by low resistance welding. The cover, casing 1 and sealing glass window 14 seal the interior of the casing 1 and maintain it in an air tight condition.

The optical fiber 10 has an obliquely ground tip, and is supported by the fiber holder 15.

Generally, a pair of optical semiconductor device modules are used respectively for a main station and a sub-station in an optical communication system. When the main station uses a wavelength of 1.55 μm for communication to the sub-station, a light emitting element 2 in the module of the main station emits beams whose wavelength λ1 is 1.55 μm. When the sub-station uses a wavelength of 1.3 μm so as to communicate with the main station, a light emitting element 2 of the sub-station emits beams having the wavelength λ1 of 1.3 μm. In the sub-station, beams arriving via an optical fiber 10 have a wavelength λ2 of 1.55 μm.

In the main station, the optical filter 11 is required to transmit the beams whose wavelength λ1 is 1.55 μm and reflect the beams whose wavelength λ2 is 1.3 μm. Further, the bandpass filter 13 has to transmit the beams whose wavelength λ2 is 1.3 μm and reflect the beams whose wavelength λ1 is 1.55 μm. On the other hand, in the sub-station, the optical filter 11 is required to transmit the beams whose wavelength λ1 is 1.3 μm and reflect the beams whose wavelength λ2 is 1.55 μm. Further, the bandpass filter 13 has to transmit the beams whose wavelength λ2 is 1.55 μm and reflect the beams whose wavelength λ1 is 1.3 μm.

The light receiving element 6 may be a ternary photodiode which is sensitive to the beams of wavelength 1.55 μm and 1.3 μm. Therefore, the light receiving elements 6 are the same in both the main station and the sub-station. In both stations, the light emitting elements 2, optical filter 11 and bandpass filters 13 are compatible with the wavelengths allotted in the respective stations they belong to.

In operation, the optical semiconductor device module functions as described below in the main station.

The light emitting element 2 emits beams having the 1.55-μm wavelength, which are converged in the first lens 8. The converged beams then pass through the optical filter 11, and are converged into the optical fiber 10. Thereafter, a light signal is transmitted to the optical semiconductor device module in the sub-station.

In the sub-station, the light signal from the main station is received by the optical semiconductor device module via the optical fiber 10. This light signal has a wavelength of 1.55 μm. The light signal is reflected by optical filter 11 and is converged onto the second lens 12, passes through the bandpass filter 13, and is finally input into the light receiving element 6.

The optical filter 11 has the anti-reflection film on the glass plate, and cannot pass all of the beams but reflects approximately 1% of the beams. Further, the multi-layer dielectric filter film cannot completely separate beams of two separate wavelengths but leaves approximately 0.1% to 1% of the beams as noise components. In other words, weak beams reflected by the optical filter 11 remain as stray beams.

The stray beams are reflected on an inner wall of the casing 1. Then, reflected stray beams pass through the optical filter 11, and are incident onto the second lens 12. Most of these beams are reflected by the bandpass filter 13, and are not incident onto the light receiving element 6. However, some of the remaining stray beams are input to the light receiving element 6, thereby generating noise.

Further, some of the beams emitted by the light emitting element 2 are reflected on an end face of the optical fiber 10, serving as stray beams. The stray beams are also reflected by the anti-reflection film and the multi-layer dielectric filter film of the optical filter 11. The reflected stray beams pass through the second lens 12 and the bandpass filter 13, and are incident onto the light receiving element 6. Most of the stray beams are reflected by the bandpass filter 13 while some of the stray beams pass through the bandpass filter 13 and are received by the light receiving element 2, thereby generating noise.

In a signal transmitting path, there are stray beams caused by an optical connector or the like connected to the optical fiber 10. These stray beams also generate noise similarly to the stray beams present on the end face of the optical fiber 10.

In order to reduce near-end crosstalk, levels of this noise should be 15 dB to 20 dB lower than a level of the light signal detected by the light receiving element 6. For instance, when a light signal detected by the light receiving element 6 has a level of approximately −30 dBm, the noise level should be kept less than −50 dBm overall. Therefore, the near-end crosstalk caused by reflection or the like in the optical semiconductor device module is set to −50 dBm or lower.

The light emitting element 2 emits beams which have a level of approximately 7 dBm. Since most of the beams are converged by the first lens 8, they should be attenuated by 57 dB or more by the optical filter 11, bandpass filter 13 and so on. If the near-end crosstalk, which is caused by reflection in the casing 1, is 57 dB or less, the optical filter 11 is required to have a more excellent performance. This means an increase in the cost of the optical filter 11. Likewise, the bandpass filter 13 is required to have improved performance, which would increase the number of bandpass filters 13 and the manufacturing cost thereof.

Conventional optical semiconductor device modules are prone to problems as described below. To reduce the near-end crosstalk, a highly efficient optical filter 11 is required. Further, it is necessary to use a very efficient bandpass filter 13 or to use a large number of bandpass filters. Thus, the greater the number of bandpass filters or the more efficient bandpass filters are, the more expensive the optical semiconductor device modules become.

SUMMARY OF THE INVENTION

To overcome the foregoing problems of the prior art, the invention provides an optical semiconductor device module comprising: a module casing; a light emitting element at one end of the module casing; an optical fiber for transmitting beams from the light emitting element to an external line and provided being at the other end of the casing; a light receiving element for receiving input beams which arrive from the external line via the optical fiber and have a wavelength different from a wavelength of the output beams emitted by the light emitting element, the light receiving element being disposed in the module casing at a position where an optical axis of the input beams intersects with an optical axis of the output beams; an optical filter for passing the output beams from the light emitting element and reflecting the input beams from the optical fiber; and a light absorbing-reflecting section absorbing a part of the output beams which cannot pass via the optical filter and reflecting a part of beams, which are not absorbed, in a direction different from the optical axis of the input beams, the light absorbing-reflecting section being formed in the module casing at a position which is on the optical axis of the input beams and confronts the light receiving element via the optical filter.

In the foregoing arrangement, a first lens is disposed between the light emitting element and the optical filter, and a second lens is disposed between the optical filter and the light receiving element. The light absorbing-reflecting section includes a light reflecting portion on an inner wall of the module casing and a plated layer on the light reflecting surface. The plated layer can absorb beams.

The light reflecting portion of the light absorbing-reflecting section is at an angle θ with an optical axis of the input beams, and θ is set within a range determined by formula φ<θ<90°−φ where φ represents half of a spreading angle of beams which come from the light emitting element and are spread via the first lens.

Some of the beams which cannot pass through the optical filter, i.e. stray beams, are absorbed by the light absorbing-reflecting section. Further, the stray beams which are not absorbed by the light absorbing-reflecting section are reflected in a direction different from an optical axis of input beams. Therefore, it is possible to reduce stray beams reaching the light receiving element, which is effective in reducing near-end crosstalk.

The light absorbing-reflecting section is present in a cavity which is at a position confronting the light receiving element and is defined in a part of the module casing.

This light absorbing-reflecting section can absorb stray beams so that such stray beams may be prevented from reaching the light receiving element. Therefore, the optical semiconductor device module can reduce the near-end crosstalk.

In the optical semiconductor device module, an inner wall of the cavity is coated with a plating capable of absorbing some of the beams which are reflected by the optical fiber.

Stray beams which are not absorbed by the light absorbing-reflecting section are reflected onto the plated inner wall of the cavity. The stray beams are then absorbed by the plated inner wall. Further, the stray beams are reflected and absorbed between the light absorbing-reflecting section and the inner wall of the cavity. Thus, stray beams will be further reduced.

Further, a window and a partition are present between the module casing and the cavity, the window passes a part of the output beams reflected by the optical filter, and the partition shields some of the beams which are re-reflected by the light absorbing-reflecting section and the cavity and are returned into the module casing.

Some of the stray beams which are not absorbed by the light absorbing-reflecting section are reflected therefrom, and re-reflected by the partition. Thus, stray beams are repeatedly absorbed and reflected in the cavity, and thereby further reduced.

The light absorbing-reflecting section includes two light reflecting portions which confront with each other and define a space for repeatedly reflecting and absorbing a part of output beams reflected by the optical filter.

Stray beams reflected by the light absorbing-reflecting section are repeatedly absorbed and reflected between the two light reflecting portions. Thus, stray beams are further reduced.

Each light reflecting portion of the light absorbing-reflecting section is a sloped surface of a cone, a many-sided pyramid, a wedge, or a tapered hole. The light reflecting portions can have a large area for absorbing stray beams.

BRIEF DESCRIPTION OF THE DRAWINGS

The invention will be described in greater detail with reference to the accompanying drawings, wherein like numerals designate corresponding parts throughout several figures.

DESCRIPTION OF THE PREFERRED EMBODIMENTS

Figure 1:
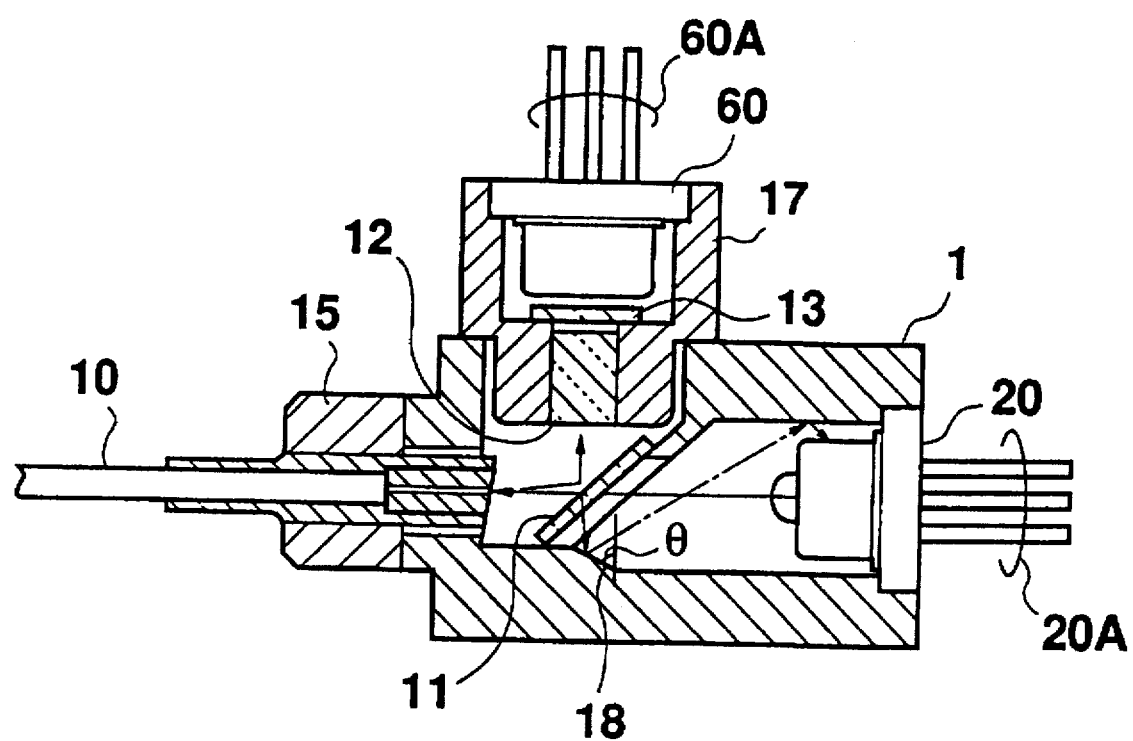
FIG. 1 is a cross section of an optical semiconductor device module according to a first embodiment of the present invention.

Embodiment 1:

Referring to FIG. 1, an optical semiconductor device module comprises a light emitting element 20, a light receiving element 60, an optical filter 11, a second lens 12, a bandpass filter 13 and a fiber holder 15, all of which are housed in a module casing 1 (called "casing 1" hereinafter).

Figure 6:
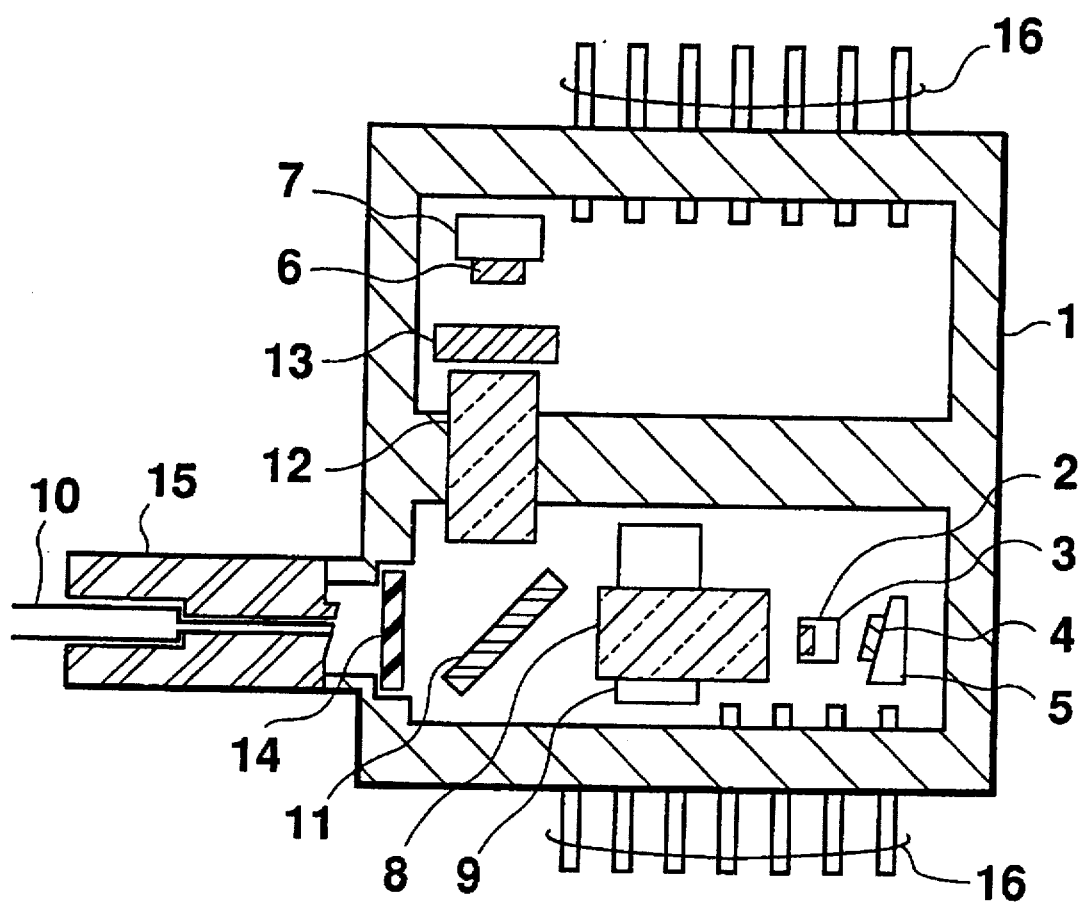
FIG. 6 is a cross section of an optical semiconductor device module of the prior art.

In FIG. 1, the light emitting element 20 is at a right part of the casing 1, and is assembled as a light emitting element package, which houses a semiconductor laser chip (light emitting element), a sub-mount, a monitoring photodiode (monitoring photodiode chip), a first lens and a lens holder. This package functions similarly to a corresponding part in the optical semiconductor device module of the prior art shown in FIG. 6. The package includes terminals 20A (leads) arranged on its exterior.

A holder 17 is secured on the casing 1 so as to receive the light receiving element 60 therein. The light receiving element 60 is also assembled as one package, which houses a semiconductor photodiode chip (light receiving element) and a sub-mount therein. Terminals 60A are arranged on an exterior of the light receiving element package.

The second lens 12 and bandpass filter 13 are secured to the holder 17 together with the light receiving element 60. The fiber holder 15 is secured at a left part of the casing 1.

A light absorbing-reflecting section 18 is present on an inner wall of the casing 1 at a position confronting the light receiving element 60 via the optical filter 11. The light absorbing-reflecting section 18 uses a part of the inner wall of the casing 1 as a light reflecting portion. The light reflecting portion is flat in this embodiment. The light absorbing-reflecting section 18 not only absorbs stray beams from the optical filter 11 and so on but also reflects stray beams in a direction such that they are not incident onto the light receiving element 60. In other words, the light absorbing-reflecting section 18 is effective in reducing the near-end crosstalk. The light absorbing-reflecting section 18 is located such that it can receive some of the output beams which come from the light emitting element 20 and are reflected by the optical filter 11. The light reflecting portion is sloped with a specific angle θ with respect to an optical axis of input beams between the optical filter 11 and the light receiving element 60 such that no beams are reflected toward the light receiving element 60. The specific angle θ of the light reflecting portion is calculated using the following formula:

Angle φ<Specific angle θ<90°− angle φ where φ represents a half of a spreading angle of outgoing beams from the light emitting element 20.

For instance, the specific angle θ may be set to 60 degrees. The light reflecting portion is coated with a plating (e.g. black chrome plating) so as to suppress reflection of beams.

In operation, the optical semiconductor device module in a main station functions as described hereinafter. Beams, which are emitted by the semiconductor laser chips (not shown) of the light emitting element 20, are converged by the first lens. In the light emitting element 20, the semiconductor laser chip emits beams having a λ1 wavelength of 1.55 μm. The converged beams pass through the optical filter 11, and are input into the optical fiber 10.

However, the optical filter 11 does not pass all the beams having the wavelength λ1 but reflects some of them. The reflected beams are stray beams and arrive at the light absorbing-reflecting section 18, which absorbs the stray beams on its plated flat surface. In the light absorbing-reflecting portion 18, the light reflecting portion is inclined by a particular angle with respect to the optical axis of the input beams so as to reflect the stray beams in a direction where they diverge from the optical axis of the input beams and do not reach the light receiving element 60. In other words, the stray beams can be substantially prevented from reaching the light receiving element 60. Thus, the optical semiconductor device module can reduce near-end crosstalk.

In the embodiment, the light reflecting portion is in the shape of a sloped surface of a cone, a many-sided pyramid, a wedge, or a tapered hole. In any case, the sloped surface should have an angle θ so as to reflect the stray beams in a particular direction with respect to the optical axis of the input beams. The sloped side as the light reflecting portion is plated so as to absorb reflected beams. The light reflecting portion is defined by the inner wall of the module casing 1.

Embodiment 2

Figure 2:
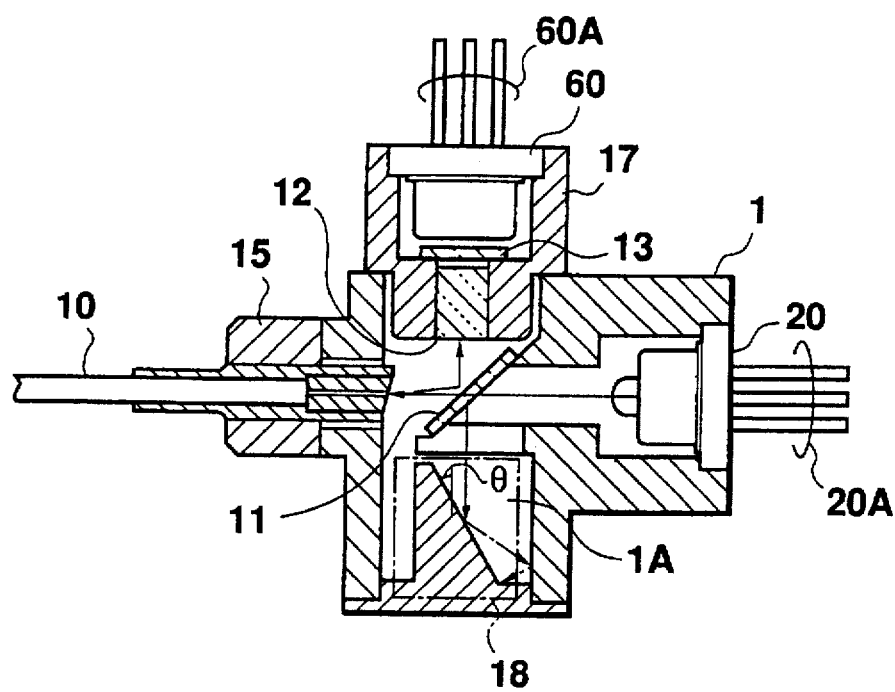
FIG. 2 Is a cross section of an optical semiconductor device module according to a second embodiment.
Figure 3:
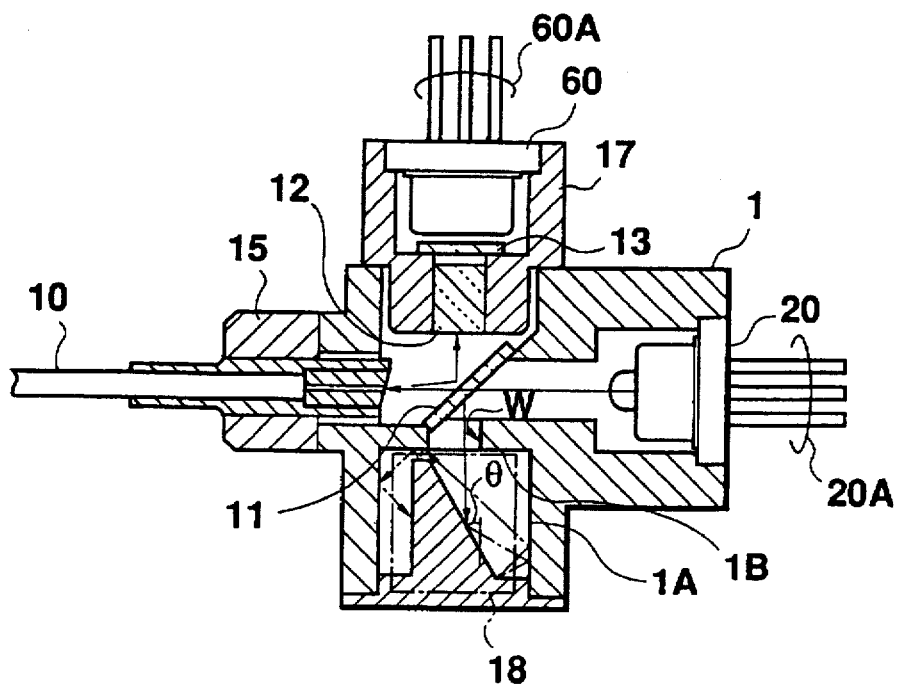
FIG. 3 is a cross section of an optical semiconductor device module according to a third embodiment.

In a second embodiment, an optical semiconductor device module differs from the foregoing optical semiconductor device module in the shape of a light absorbing-reflecting section. Referring to FIG. 2, this optical semiconductor device module comprises the light emitting element 20 and the light receiving element 60, each of which is in the shape of a package. The casing 1 extends downward such that it has a cylindrical cavity 1A therein. The cylindrical cavity 1A is present at a position where the light receiving element 60 confronts with the module casing 1. A wall of cavity 1A is plated so as to absorb stray beams introduced therein. A light absorbing-reflecting section 18 is present in the cylindrical cavity 1A. Thus, the wall of the cavity 1A' absorbs beams which are reflected in a particular direction by the light absorbing-reflecting section 18. As shown in FIG. 2, a light receiving element holder 17 is secured to the upper part of the casing 1. The holder 17 and the light absorbing-reflecting section 18 are at positions symmetrical to each other.

The light absorbing-reflecting section 18 has a trapezoidal cross section, and a light reflecting portion so as to reflect stray beams in a particular direction. The light reflecting portion is at an angle θ of 30 degrees with the optical axis of the input beams, for example, so as to actively attenuate the stray beams in the cylindrical cavity 1A. The light absorbing-reflection section 18 is plated, at least at its sloped light reflecting portion, so as to absorb the stray beams.

In operation, the optical semiconductor device module functions as follows in the main station. Beams emitted by the light emitting element 20 pass through the optical filter 11, and reach the optical fiber 10. The optical filter 11 does not pass all the beams but reflects some of them as stray beams. The stray beams from the optical filter 11 arrive at the light absorbing-reflecting section 18 in the cylindrical cavity 1A. The light absorbing-reflecting section 18 has the sloped light reflecting portion as described above. Thus, a certain distance is secured between the optical filter 11 and the center of the sloped light reflecting portion, which allows the sloped light reflecting portion to have a large area for absorbing stray beams. In other words, the stray beams spread extensively while they reach the sloped light reflecting portion Thus, the sloped light reflecting portion can absorb more stray beams.

Stray beams which are not first absorbed by the plating on the sloped light reflecting portion are reflected and spread therefrom, thereby reaching the wall of the cavity 1A. The wall of the cavity 1A is coated with a plating similarly to the sloped side light reflecting portion of the light absorbing-reflecting section 18. Some of the stray beams reaching the wall of the cavity 1A are absorbed by the plating thereon while stray beams which are not absorbed are again reflected from the wall of the cavity 1A. These stray beams are extensively spread, arriving at the sloped light reflecting portion of the light absorbing-reflecting section 18, and being absorbed therein. In other words, the stray beams are repeatedly reflected between the sloped light reflecting section portion and wall of the cavity 1A. Likewise, the stray beams are repeatedly absorbed. The more repeatedly stray beams are reflected, the wider they spread and the more they are attenuated, and the wider the plating area appears to be. Thus, the stray beams can be attenuated at a speed which is twice a usual speed.

Stray beams arriving at the light receiving element 60 can be substantially reduced, which enables the optical semiconductor device module to reduce the near-end crosstalk.

In the second embodiment, the light reflecting portion of the light absorbing-reflecting section 18 is not limited to being trapezoidal in cross section, but may be in the shape of a cone, a many-sided pyramid, a wedge, or a tapered hole. In any case, the light absorbing-reabsorbing-reflecting sections 18 is present in the cylindrical cavity 1A.

Embodiment 3

In a third embodiment, the optical semiconductor device module of the second embodiment also includes a partition 1B between the casing 1 and the cylindrical cavity 1A in which the light absorbing-reflection section 18 is present.

The optical semiconductor device module is substantially the same as that of the second embodiment, i.e. it includes the light emitting element package 20 and the light receiving element package 60. The partition 1B has a small window W which is designed so as to pass only spray beams that are reflected by the optical filter 11 and spread therein. The window W is circular, for instance. The partition 1B is effective in preventing stray beams, which are reflected by the wall of the cavity 1A, from returning to the module casing 1. The wall of the cavity 1A is coated with a plating which can absorb stray beams. The plating is similar to that coated on the sloped light reflecting portion of the light absorbing-reflecting section 18.

In operation, the optical semiconductor device module functions in the main station as follows. Beams emitted by the light emitting element 20 pass through the optical filter 11, and reach the optical fiber 10. Since the optical filter 11 does not pass all the beams, some of them are reflected therefrom as stray beams. These stray beams pass through the window W of the partition 1B, arriving at the light absorbing-reflecting section 18 in the cavity 1A. Stray beams reflected from the optical filter 11 are spread while they travel to the sloped light reflecting portion of the light absorbing-reflecting section 18. The spread stray beams reach a large area on the sloped side and are absorbed by the sloped light reflecting portion.

Stray beams which have not been absorbed by the plating on the sloped light reflecting portion are repeatedly reflected between the sloped light reflecting portion and the wall of the cavity 1A. Thus, stray beams will be absorbed by the plating on the sloped side and the wall of the cavity 1A.

Further, stray beams which have not been absorbed by the sloped light reflecting portion and the wall of the cavity 1A after repeated reflection tend to return to an interior of the casing 1, but are absorbed by the plating on the partition 1B. Stray beams which are not absorbed by the partition 1B are returned into the cavity 1A, where they are again repeatedly reflected. Thus, stray beams will be substantially reduced before reaching the light receiving element 60, which enables the optical semiconductor device module to reduce the near-end crosstalk.

The light reflecting portion is not limited to being trapezoidal its cross section. So long as it can absorb and reflect stray beams in a particular direction, the light reflecting portion may be in the shape of a cone, a many-sided pyramid, a wedge, or a tapered hole. In any case, the light absorbing-reflecting section should be present in the cavity 1A.

Embodiment 4

An optical semiconductor device module differs from the optical semiconductor device module of the second embodiment only in that the light absorbing-reflecting section 18 includes two light reflecting portions which confront each other. One light reflecting portion absorbs stray beams while the other light reflecting portion reflects stray beams.

Figure 4:
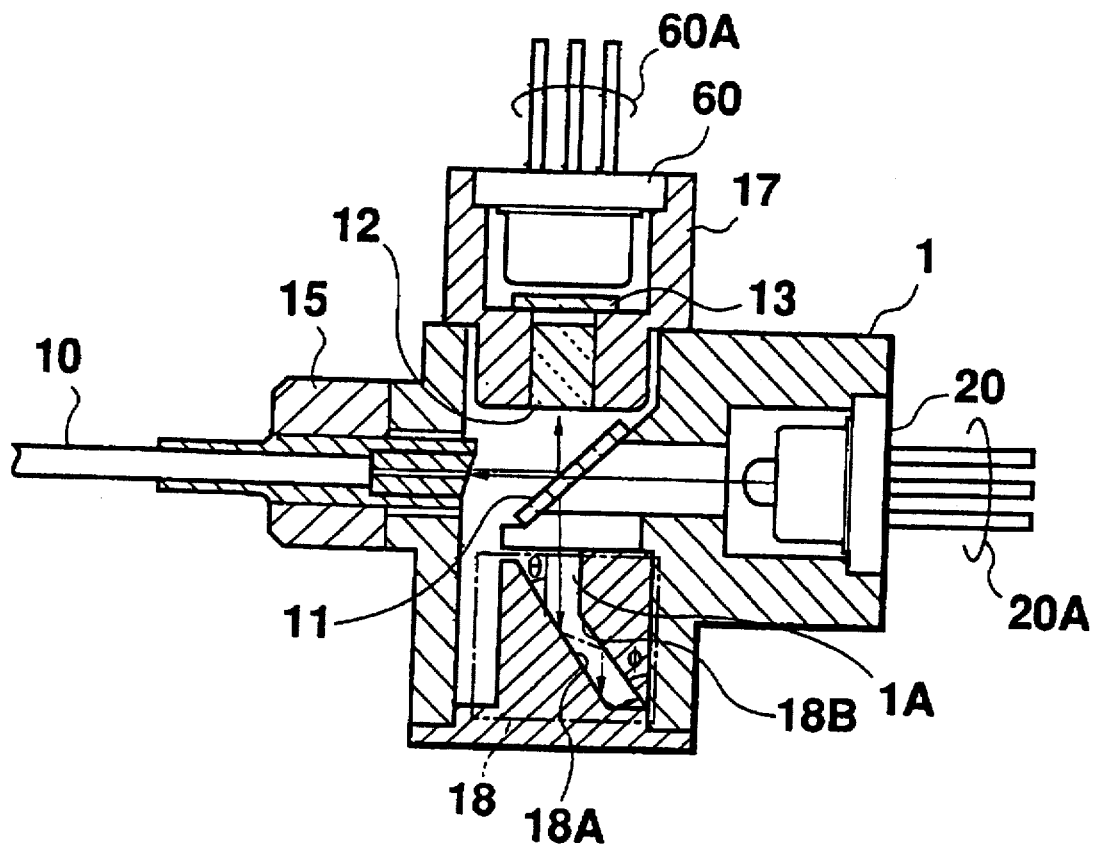
FIG. 4 is a cross section of an optical semiconductor device module according to a fourth embodiment.

Referring to FIG. 4, the light absorbing-reflecting section 18 includes the two light reflecting portions, i.e. a first light reflecting portion 18A and a second light reflecting portion 18B. The first light reflecting portion 18A corresponds to the light reflecting portions in the second and third embodiment. Therefore, the first light reflecting portion 18A is at an angle θ of 30 degrees with the optical axis of the input beams, for example, and is coated with a plating which can absorb stray beams.

The second light reflecting portion 18B confronts the first light reflecting portion 18A with a given space kept therebetween. The second light reflecting portion 18B is inclined at an angle larger than that of the first light reflecting portion 18A such that stray beams can be repeatedly and extensively reflected in the foregoing space. For instance, the second light reflecting portion 18B is at an angle of 35 degrees with the optical axis of the input beams, and is coated with a plating so as to absorb stray beams similarly to the first light reflecting portion 18A.

In operation, beams emitted by the light emitting element 20 pass through the optical filter 11, and arrive at the optical fiber 10. Since the optical filter 11 cannot pass all the beams but reflect some of them as stray beams, the stray beams reach the light absorbing-reflecting section 18 in the cavity 1A. The stray beams spread as they arrive at the first light reflecting portion 18A, and spread over a wide area of the first light reflecting portion 18A. Thus, most of the stray beams are extensively absorbed by the first light reflecting portion 18A.

Stray beams which are not absorbed by the first light reflecting portion 18A are reflected therefrom, reaching the second light reflecting portion 18B. Some of the stray beams are absorbed by the plating on the second light reflecting portion 18B while those not absorbed are reflected therefrom toward the first light reflecting portion 18A. Stray beams are again absorbed by the first light reflecting portion 18A. In other words, the stray beams are repeatedly absorbed and reflected between the first and second light reflecting portions 18A and 18B, thereby being reduced. Stray beams which have not been absorbed by the light absorbing-reflecting section 18 advance toward the light receiving element 60. Since the cavity 1A is in connection with the casing 1 at one end and is closed at the other end thereof, the remaining stray beams are reflected by the closed end of the cavity 1A, and tend to return to the casing 1. These stray beams are repeatedly absorbed and reflected by the first and second light reflecting portions 18A and 18B, thereby being reduced extensively. A distance between the first and second light reflecting portions 18A and 18B is shorter than that between the first light reflecting portion 18A and the —optical filter 11. This increases the number of times which stray beams are reflected in the space defined by the first and second light reflecting portions 18A and 18B and are absorbed by these light reflecting portions 18A and 18B. The more frequently the stray beams are reflected and absorbed, the wider they spread in the foregoing space, which means that the area absorbing the stray beams (effective areas of the first and second light reflecting portions 18A and 18B which actually absorb the stray beams) is enlarged. Therefore, an amount of stray beams reaching the light receiving element 60 is substantially reduced, thereby enabling the optical semiconductor device module to reduce near-end crosstalk.

Embodiment 5

In a fifth embodiment, an optical semiconductor device module differs from the optical semiconductor device module of the third embodiment in that the light absorbing-reflecting section 18 includes two light reflecting portions which are larger than those of the third embodiment.

Figure 5:
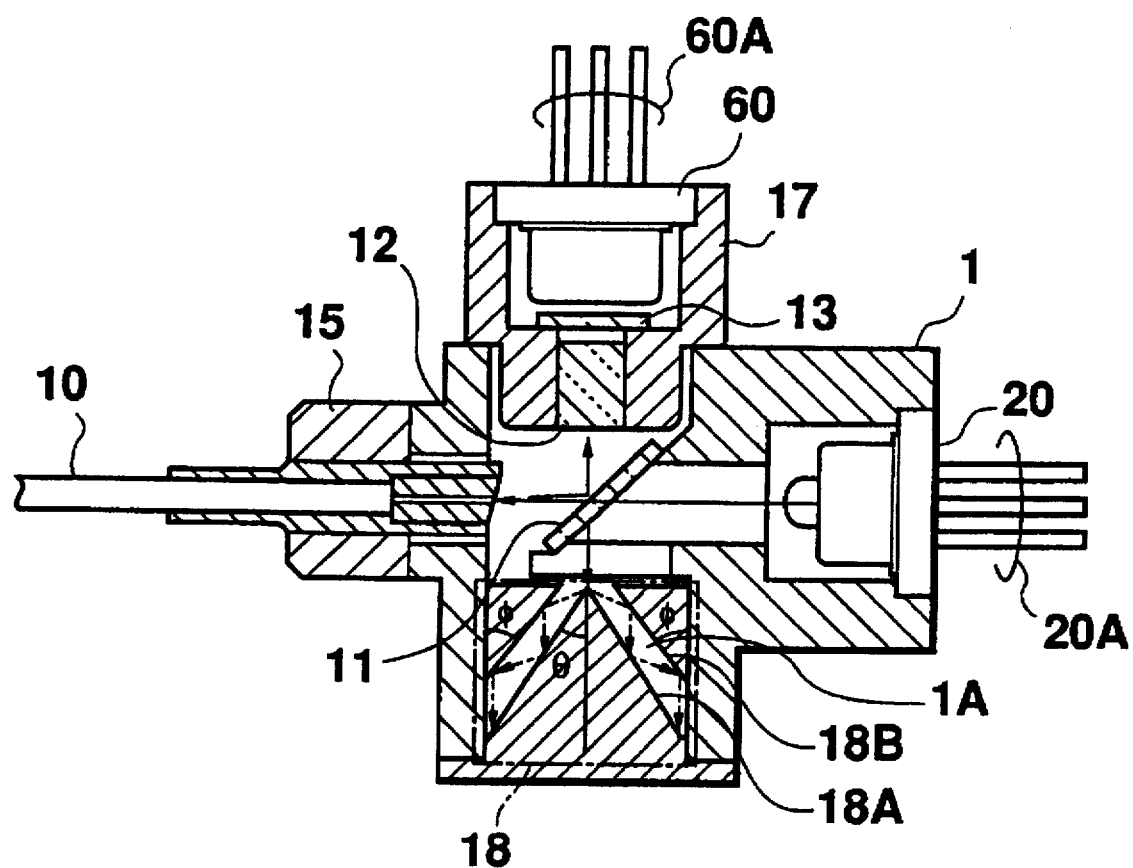
FIG. 5 is a cross section of an optical semiconductor device module according to a fifth embodiment.

Referring to FIG. 5, the optical semiconductor device module comprises the light emitting element package 20 and the light receiving element package 60 similar to those in the fourth embodiment. The light absorbing-reflecting section 18 is present in the cavity 1A, and has first and second light reflecting portions 18A and 18B.

Specifically, the first light reflecting portion 18A is in the shape of a cone or a many-sided pyramid having its point in the vicinity of the optical filter 11, and has a wide light reflecting and absorbing area. The first light reflecting portion 18A is at an angle θ of 30 degrees with respect to the optical axis of the input beams, for example. Thus, the angle θ is equal to half of an apex angle of the cone or many-sided pyramid. The first light reflecting portion 18A is coated with a plating which can absorb stray beams.

The second light reflecting portion 18B is designed such that it partly surrounds the first light reflecting portion 18A with a space kept therebetween. In other words, the second light reflecting portion 18B is defined by an inner wall of an inverted hollow cone or many-sided pyramid, which has, at its top, an opening for receiving stray beams. The second light reflecting portion 18B is sloped at an angle which is slightly larger than the inclined angle of the first light reflecting portion 18A. For example, this angle is 35 degrees. The second light reflecting portion 18B is coated with a plating similarly to the first light reflecting portion 18A so as to absorb stray beams.

In operation, beams emitted by the light emitting element 20 pass through the optical filter 11, and arrive at the optical fiber 10. Since the optical filter 11 cannot pass all the beams but reflects some of them as stray beams, the stray beams reach the light absorbing-reflecting section 18 in the cavity 1A. The stray beams spread as they arrive at the first light reflecting portion 18A of the light absorbing-reflecting section 18, and spread over a wide area of the first light reflecting portion 18A. Thus, most of the stray beams are extensively absorbed by the first light reflecting portion 18A.

Stray beams which are not absorbed by the first light reflecting portion 18A are reflected therefrom, thereby arriving at the second light reflecting portion 18B, which is plated all over the reverse cone or reverse many-sided pyramid, and has a large area. Stray beams which are not absorbed by the second light reflecting portion 18B are reflected therefrom, and are absorbed again by the first light reflecting layer 18A. In other words, the stray beams are repeatedly absorbed and reflected between the first and second light reflecting portions 18A and 18B, so few stray beams remain.

A first group of stray beams from the optical filter 11 is absorbed and reflected by the first light reflecting portion 18A. The stray beams which are reflected by the first light reflecting portion 18A reach the space between the first and second light reflecting portions 18A and 18B, and are repeatedly absorbed and reflected therein, thereby moving deep into the space. Still remaining stray beams are reflected at the end of the cavity 1A, trying to return to the module case 1. These stray beams are repeatedly absorbed and reflected on the first and second light reflecting portions 18A and 18B in the space therebetween. Therefore, substantially all of the strays beams are reduced. Further, the distance between the first and second light reflecting portions 18A and 18B is shorter than the distance between the first reflecting portion 18A and the optical filter 11. Therefore, it is possible to increase the number of times in which the stray beams are reflected between the first and second light reflecting portions 18A and 18B. In other words, the more often the stray beams are reflected in the foregoing space, the more often the stray beams can be absorbed therein. Further, the more often the stray beams are reflected, the wider the stray beams will be spread. This means that the stray beams can be absorbed over a wider area.

It is possible to substantially reduce stray beams reaching the light receiving element 60, so near-end crosstalk can be reduced in the optical semiconductor module.

What is claimed is:

1. An optical semiconductor device module comprising:

(a) a module casing having a first end and a second end opposing the first end;

(b) a light emitting element at the first end of the module casing;

(c) an optical fiber for transmitting beams from the light emitting element to an external line and being at the second end of the module casing;

(d) an optical filter disposed between the light emitting element and the optical fiber for passing output beams from the light emitting element and reflecting input beams from the optical fiber;

(e) a light receiving element for receiving the input beams which arrive from the external line via the optical fiber and have a wavelength different from a wavelength of the output beams emitted by the light emitting element, the light receiving element being disposed in the module casing on an optical axis of reflected input beams that are reflected by the optical filter at a distance from where the optical axis of the reflected input beams intersects an optical axis of the output beams;

(f) a light absorbing-reflecting section for absorbing a first portion of reflected output beams that do not pass via the optical filter and reflecting a second portion of the reflected output beams, which are not absorbed by the light absorbing-reflecting section in a direction different from the optical axis of the reflected input beams, the light absorbing-reflecting section being formed in the module casing at a position which is on the optical axis of the reflected input beams and confronts the light receiving element;

a first lens disposed between the light emitting element and the optical filter; and a second lens disposed between the optical filter and the light receiving element;

wherein the light absorbing-reflecting section includes a light reflecting surface on an inner wall of the module casing and a plated layer on the light reflecting surface, the plated layer being capable of absorbing beams.

2. The optical semiconductor device module of claim 1, wherein the light absorbing-reflecting section is formed at an angle θ with respect to the optical axis of the reflected input beams, and θ is set within a range determined by formula $$\phi < \theta < 90° - \phi$$

where φ represents half of a spreading angle of beams which come from the light emitting element and are spread via the first lens.

3. An optical semiconductor device module comprising:

(a) a module casing having a first end and a second end opposing the first end;

(b) a light emitting element at the first end of the module casing;

(c) an optical fiber for transmitting beams from the light emitting element to an external line and being at the second end of the module casing;

(d) an optical filter disposed between the light emitting element and the optical fiber for passing output beams from the light emitting element and reflecting input beams from the optical fiber;

(e) a light receiving element for receiving the input beams which arrive from the external line via the optical fiber and have a wavelength different from a wavelength of the output beams emitted by the light emitting element, the light receiving element being disposed in the module casing on an optical axis of reflected input beams that are reflected by the optical filter at a distance from where the optical axis of the reflected input beams intersects an optical axis of the output beams; and (f) a light absorbing-reflecting section for absorbing a first portion of reflected output beams that do not pass via the optical filter and reflecting a second portion of the reflected output beams, which are not absorbed by the light absorbing-reflecting section in a direction different from the optical axis of the reflected input beams, the light absorbing-reflecting section being formed in the module casing at a position which is on the optical axis of the reflected input beams and confronts the light receiving element;

wherein the light absorbing-reflecting section is formed in a cavity, the cavity confronting the light receiving element and being defined in a part of the module casing.

4. The optical semiconductor device module of claim 3, wherein an inner wall of the cavity is plated and is capable of absorbing some of the input beams which are reflected by the optical filter.

5. The optical semiconductor device module of claim 3, further comprising:

a partition formed across a portion of a space between the cavity and the optical filter so that reflected output beams that are re-reflected by the light absorbing-reflecting section are blocked from exiting the cavity.

6. The optical semiconductor device module of claim 3, wherein the light absorbing-reflecting section includes two light reflecting portions which confront each other and define a space for repeatedly reflecting and absorbing some of the reflected output beams reflected by the optical filter.

7. The optical semiconductor device module of claim 6, wherein the two light reflecting portions are plated and are capable of absorbing some of the reflected output beams.

8. The optical semiconductor device module of claim 3 or 6, wherein the light absorbing-reflecting section is in the shape of at least one of a sloped surface of a cone, a many-sided pyramid, a wedge, and a tapered hole.

9. An optical semiconductor device module comprising:

a module casing having a first end and a second end opposing the first end;

a light emitting element disposed at the first end of the module casing;

a receptacle disposed at the second end of the module casing, the receptacle to receive an optical fiber;

an optical filter disposed between the light emitting element and the receptacle the optical filter transmitting output light beams emitted by the light emitting element and reflecting input light beams received at the receptacle;

a light receiving element to receive reflected input light beams that are reflected by the optical filter, the light receiving element being disposed along an optical axis of the reflected input light beams at a distance from an intersection of an optical axis of the output light beams and the optical axis of the reflected input light beams; and preventing means, formed in the module casing, for preventing reflected output light beams that are reflected by the optical filter from being received by the light receiving element;

wherein the preventing means includes means for absorbing the reflected output light beams and means for re-reflecting reflected output beams that are not absorbed by the means for absorbing.

10. The optical semiconductor device module of claim 9, wherein the means for re-reflecting reflects the reflected output beams that are not absorbed by the means for absorbing in a direction different than a direction of the optical axis of the reflected input light beams.

11. The optical semiconductor device module of claim 10, wherein the preventing means is formed along the optical axis of the reflected input light beams obliquely confronting the light receiving element.

12. An optical semiconductor device module comprising:

a module casing having a first end and a second end opposing the first end;

a light emitting element disposed at the first end of the module casing;

a receptacle disposed at the second end of the module casing, the receptacle to receive an optical fiber;

an optical filter disposed between the light emitting element and the receptacle, the optical filter transmitting output light beams emitted by the light emitting element and reflecting input light beams received at the receptacle;

a light receiving element to receive reflected input light beams that are reflected by the optical filter, the light receiving element being disposed along an optical axis of the reflected input light beams at a distance from an intersection of an optical axis of the output light beams and the optical axis of the reflected input light beams; and preventing means, formed in the module casing, for preventing reflected output light beams that are reflected by the optical filter from being received by the light receiving element;

wherein the preventing means includes means for absorbing the reflected output light beams and means for re-reflecting, in a direction different than a direction of the optical axis of the reflected input light beams, reflected output light beams that are not absorbed by the means for absorbing; and wherein the preventing means is formed along the optical axis of the reflected input light beams obliquely confronting the light receiving element within a cavity of the module casing.

13. The optical semiconductor device module of claim 12, wherein the preventing means includes a pair of surfaces forming an acute angle towards the light receiving element approximately centered along the optical axis of the reflected input light beams so that the reflected output light beams are re-reflected by at least one of the pair of surfaces away from the optical axis of the reflected input light beams.

14. The optical semiconductor device module of claim 12, wherein an inner wall of the cavity includes means for absorbing and reflecting the reflected output beams that are not absorbed by the means for absorbing.

15. An optical semiconductor device module comprising:

a module casing having a first end and a second end opposing the first end;

a light emitting element disposed at the first end of the module casing;

a receptacle disposed at the second end of the module casing, the receptacle to receive an optical fiber;

an optical filter disposed between the light emitting element and the receptacle, the optical filter transmitting output light beams emitted by the light emitting element and reflecting input light beams received at the receptacle;

a light receiving element to receive reflected input light beams that are reflected by the optical filter, the light receiving element being disposed along an optical axis of the reflected input light beams at a distance from an intersection of an optical axis of the output light beams and the optical axis of the reflected input light beams; and preventing means, formed in the module casing, for preventing reflected output light beams that are reflected by the optical filter from being received by the light receiving element;

wherein the preventing means is formed along the optical axis of the reflected input light beams and obliquely confronts the light receiving element.

16. The optical semiconductor device module of claim 15, wherein the preventing means includes first absorbing-reflecting means for absorbing a first potion of the reflected output light beams and for reflecting, in a direction different than a direction of the optical axis of the reflected input light beams, a second portion of the reflected output light beams.

17. The optical semiconductor device module of claim 16, wherein the preventing means is formed within a cavity of the module casing.

18. The optical semiconductor device module of claim 17, wherein the preventing means further includes second absorbing-reflecting means, confronting the first absorbing-reflecting means, for absorbing a portion of the second portion of the reflected output light beams, and for reflecting, in a direction different than the optical axis of the reflected input light beams, a portion of the second portion of the reflected output light beams.

19. The optical semiconductor device module of claim 18, further comprising:

a partition between the cavity and the optical filter, the partition having an opening which allows the reflected output beams to enter the cavity, wherein the opening in the partition is more narrow than a width of the cavity so that reflected output beams that re-reflected by the first and second absorbing-reflecting means are blocked from exiting the cavity.

20. The optical semiconductor device module of claim 18, wherein the first absorbing-reflecting means forms a first acute angle with the optical axis of the reflected input light beams, and the second absorbing-reflecting means forms a second acute angle with the optical axis of the reflected input light beams, the second acute angle being larger than the first acute angle.

21. The optical semiconductor device module of claim 20, wherein the first absorbing-reflecting means is in a shape of at least one of a sloped surface of a cone, a many sided pyramid, a wedge, and a tapered hole.

* * * * *